(12) United States Patent
Jin et al.

(10) Patent No.: US 11,031,609 B2
(45) Date of Patent: Jun. 8, 2021

(54) FUEL CELL STACK

(71) Applicants: Hyundai Motor Company, Seoul (KR); Kia Motors Corporation, Seoul (KR)

(72) Inventors: Sang Mun Jin, Gyeonggi-Do (KR); Yoo Chang Yang, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 93 days.

(21) Appl. No.: 16/518,184

(22) Filed: Jul. 22, 2019

(65) Prior Publication Data

US 2019/0348690 A1 Nov. 14, 2019

Related U.S. Application Data

(62) Division of application No. 14/943,768, filed on Nov. 17, 2015, now Pat. No. 10,403,910.

(30) Foreign Application Priority Data

Dec. 12, 2014 (KR) .................. 10-2014-0179605

(51) Int. Cl.
*H01M 8/249* (2016.01)
*H01M 8/2465* (2016.01)
(Continued)

(52) U.S. Cl.
CPC ......... *H01M 8/0258* (2013.01); *H01M 8/026* (2013.01); *H01M 8/04029* (2013.01);
(Continued)

(58) Field of Classification Search
None
See application file for complete search history.

(56) References Cited

U.S. PATENT DOCUMENTS

| 8,158,299 B2 | 4/2012 | Blank et al. |
| 2003/0124411 A1* | 7/2003 | Cisar .................. H01M 8/0234 429/434 |

(Continued)

FOREIGN PATENT DOCUMENTS

| JP | 2004-335453 A | 11/2004 |
| JP | 2007-165144 A | 6/2007 |

(Continued)

OTHER PUBLICATIONS

Notice of Allowance dated Nov. 6, 2017 in corresponding Korean Application No. KR 10-2014-017965.

*Primary Examiner* — Yoshitoshi Takeuchi
(74) *Attorney, Agent, or Firm* — Mintz Levin Cohn Ferris Glovsky and Popeo, P.C.; Peter F. Corless

(57) ABSTRACT

Disclosed herein is a fuel cell stack with improved manufacturing performance. The fuel cell stack includes: a separator that comprises a diffusion part, as being provided with a diffusion channel, configured to distribute reaction gas and cooling water and a reaction part, as being continuously formed from the diffusion part and provided with a reaction channel that has a height greater than that of the diffusion channel, configured to move reaction gas distributed from the diffusion part and generate electrons by a chemical reaction; and a gas diffusion layer configured to contact the separator at the diffusion part and the reaction part.

4 Claims, 2 Drawing Sheets

(51) Int. Cl.
  *H01M 8/24* (2016.01)
  *H01M 8/0258* (2016.01)
  *H01M 8/0202* (2016.01)
  *H01M 8/02* (2016.01)
  *H01M 8/1006* (2016.01)
  *H01M 8/026* (2016.01)
  *H01M 8/0254* (2016.01)
  *H01M 8/0247* (2016.01)
  *H01M 8/04029* (2016.01)

(52) U.S. Cl.
  CPC .......... *H01M 2250/20* (2013.01); *Y02P 70/50* (2015.11); *Y02T 90/40* (2013.01)

(56) References Cited

U.S. PATENT DOCUMENTS

| | | |
|---|---|---|
| 2004/0058223 A1 | 3/2004 | Shibata et al. |
| 2006/0115710 A1 | 6/2006 | Kusakabe et al. |
| 2007/0087256 A1* | 4/2007 | Hirashige ........... H01M 8/0612 429/419 |
| 2012/0315556 A1* | 12/2012 | Darling ............... H01M 8/0267 429/413 |
| 2013/0011770 A1 | 1/2013 | Pandy et al. |

FOREIGN PATENT DOCUMENTS

| | | |
|---|---|---|
| JP | 2008-287910 A | 11/2008 |
| KR | 10-2006-0019998 | 3/2006 |
| KR | 10-1282619 | 7/2013 |
| KR | 10-1410480 | 6/2014 |

* cited by examiner

FUEL CELL STACK

CROSS-REFERENCE TO RELATED APPLICATION

This application is Divisional application of U.S. patent application Ser. No. 14/943,768, filed Nov. 17, 2015 and is based on and claims the benefit of priority to Korean Patent Application No. 10-2014-0719605, filed on Dec. 12, 2014 in the Korean Intellectual Property Office, the disclosure of which is incorporated herein in its entirety by reference.

TECHNICAL FIELD

The present invention relates to a fuel cell stack with improved manufacturing performance.

BACKGROUND

Recently, various eco-friendly electric vehicles which may have reduced energy consumption and environmental pollution have been developed. An example of the eco-friendly electric vehicle may include a fuel cell vehicle and a hybrid vehicle.

The fuel cell vehicle refers to a vehicle which uses electricity generated by an electrochemical reaction of hydrogen and oxygen as an energy source. The hybrid vehicle refers to a vehicle which uses an internal combustion engine while it is driven at a high speed or driven on an uphill road and uses electricity as the energy source while it is driven at a low speed or stopped.

Generally, the vehicle of internal combustion engine is driven by driving power which is generated by an explosive reaction of fossil fuel with oxygen in the air within an engine to convert the chemical energy into mechanical energy. Meanwhile, the fuel cell vehicle is driven by electric energy which is generated by an electrochemical reaction of hydrogen supplied through a high pressure hydrogen tank or a reformer with oxygen in the air supplied through an air turbo compressor within a fuel cell stack.

In other words, the fuel cell system is an apparatus which directly converts energy of fuel into electrical energy. Further, the fuel cell system includes a pair of electrodes, i.e. an anode and a cathode, having an electrolyte disposed therebetween and obtains electricity and heat by an electrochemical reaction of ionized fuel gas.

A polymer electrolyte membrane (PEM) fuel cell may have a high current density, a low operation temperature, low corrosion and a reduced loss of electrolyte, and thus, the PEM fuel cell has been developed as a power source for military use or a space ship. Recently, the polymer electrolyte membrane (PEM) fuel cell may have a high output density and may be modularized due to a simple structure, and researches for applying the polymer electrolyte membrane fuel cell as a power source for a vehicle have been actively conducted.

In the related art, a flux distribution stabilizer of the fuel cell has been reported in Korean Patent Laid-Open Publication No. 10-2006-0019998. For instance, the conventional flux distribution stabilizer of the fuel cell may be technology of controlling dynamic characteristics of the flux in the fuel cell stack to prevent stack performance from being reduced and assure stabilized cell performance.

Meanwhile, when a channel interval of a diffusion part is formed to be narrow, a fuel cell separator of the fuel cell stack improves distribution performance of reaction gas but manufacturing performance of the separator may be degraded. Further, when the channel interval of the diffusion part is formed to be wide, the fuel cell separator of the fuel cell stack may have the improved manufacturing performance but may cause an increase in a differential pressure and a reduction in water discharge performance due to an excessive permeation of a gas diffusion layer (GDL) into the channel, thereby reducing system efficiency.

The contents described as the related art have been provided only for assisting in the understanding for the background of the present invention and should not be considered as corresponding to the related art known to those skilled in the art.

SUMMARY

In one aspect, the present invention provides a fuel cell stack that can address one or more of the above-mentioned problems occurring in the conventional fuel cell stack in the related art.

The present invention provides a fuel cell stack that may be manufactured by changing a height of a diffusion channel which is present to uniformly distribute reaction gas in a separator. Accordingly, manufacturing performance of the separator may be improved and also, efficiency of a fuel cell system may be improved by reducing a differential pressure.

According to an exemplary embodiment of the present invention, a fuel cell stack may include: a separator which comprises a diffusion part, as being provided with a diffusion channel, configured to distribute reaction gas and cooling water and a reaction part, as being continuously formed from the diffusion part and provided with a reaction channel that has a height greater than that of the diffusion channel, configured to move reaction gas distributed from the diffusion part and generate electrons by a chemical reaction; and a gas diffusion layer configured to contact the separator at the diffusion part and the reaction part.

A compression rate where the diffusion part and the gas diffusion layer are contacted to each other may be less than a compression rate where the reaction part and the gas diffusion layer are contacted to each other.

The diffusion channel and the reaction channel may be continuously formed to each other. Alternatively, the diffusion channel and the reaction channel may be discontinuously formed to each other.

The diffusion channel may have a height less than that of the reaction channel, and the diffusion channel may have a width greater than that of the reaction channel.

According to an exemplary embodiment of the present invention, a fuel cell stack may include: a separator that comprises a diffusion part, as being provided with a diffusion channel, configured to distribute reaction gas and cooling water and a reaction part, as being continuously formed from the diffusion part and inserted with a micro porous body that has a plurality of channels provided therein, configured to move reaction gas distributed from the diffusion part and generate electrons by a chemical reaction; and a gas diffusion layer configured to contact the separator at the diffusion part and the reaction part.

The micro porous body may be inserted between the reaction part and the gas diffusion layer.

Further provided is a vehicle that may comprise the fuel cell stack as described herein.

Other aspects of the invention are disclosed infra.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
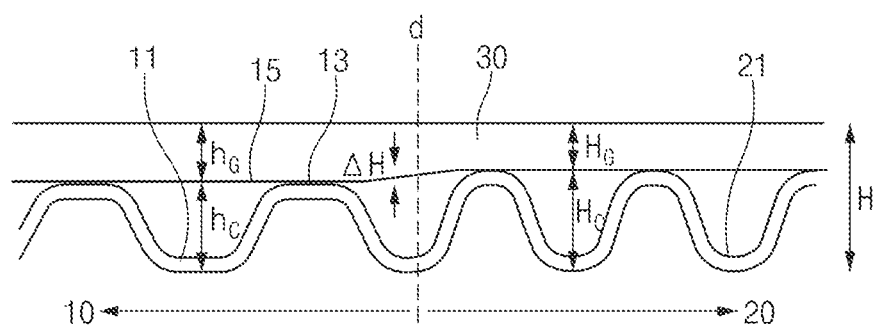
FIG. 1 illustrates a cross-sectional view of an exemplary separator including a diffusion part and a reaction part, and a gas diffusion layer in an exemplary fuel cell stack according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, various exemplary embodiments of the present invention will be described in detail with reference to the accompanying drawings. However, the present disclosure will be not limited or restricted to the exemplary embodiments below. Like reference numerals proposed in each drawing denote like components.

FIG. 1 shows a cross-sectional view schematically of a diffusion part, a reaction part, and a gas diffusion layer in an exemplary fuel cell stack according to an exemplary embodiment of the present invention.

As illustrated in FIG. 1, the fuel cell stack may include: a separator and a gas diffusion layer (GDL) 30. The separator may include a diffusion part 10, as being provided with a diffusion channel 11, configured to distribute reaction gas and cooling water and a reaction part 20, as being continuously formed from the diffusion part 10 and provided with a reaction channel 21 that has a height greater than that of the diffusion channel 11, configured to move the reaction gas distributed from the diffusion part 10 and generate electrons by a chemical reaction. The gas diffusion layer 30 may contact the diffusion part 10 and the reaction part 20 of the separator.

As shown in FIG. 1, $h_C$ refers to a height of the diffusion channel 11 of the diffusion part 10. The height of the diffusion channel 11 ($h_C$) may be equal to or greater than about 300 μm. Further, in FIG. 1, H refers to a total thickness of the separator and the gas diffusion layer 30. $H_C$ refers to a height of a reaction channel 21 in the reaction part 20. As shown in FIG. 1, in the gas diffusion layer, $h_G$ refers to a height of the gas diffusion layer 30 disposed at the diffusion part 10 side, and $H_G$ refers to a height of the gas diffusion layer 30 disposed at the reaction part 20 side.

As used herein, G refers to a thickness before the gas diffusion layer 30 is compressed, and C refers to a compression rate of the gas diffusion layer 30. In particular, the compression rate C of the gas diffusion layer may ranges from about 0.05 to about 0.5. As such, the following Formulae 1-3 may be satisfied or provided in connection with $h_C$, $h_G$, $H_C$, $H_G$, $H_G$, H, G and C, according to an exemplary embodiment of the present invention.

$$0.05 \leq C \leq 0.25 \quad [1]$$

$$H_G = (1-C)*G \quad [2]$$

$$H = H_C + H_G = h_C + h_G \quad [3]$$

As shown in a cross section of the diffusion part 10 of FIG. 1, the diffusion part 10 may be formed to be wrinkled and may have a channel shape where the diffusion channel 11 is formed at the wrinkled portion.

Further, when the gas diffusion layer 30 contacts the diffusion part 10, due to a structure of the diffusion part 10 having the channel shape, a compressed surface 13 to which the gas diffusion layer 30 and the diffusion part 10 are contacted and a non-compressed surface 15 to which the gas diffusion layer 30 and the diffusion part 10 are not contacted may be present.

Since the reaction channel 21 of the reaction part 20 which is continuously formed to the diffusion part 10 is a moving path of generated electrons, a contact pressure between the reaction part 30 and the gas diffusion layer (GDL) 30 may be increased to make electricity efficiency good.

Meanwhile, when the contact pressure between the reaction part 20 and the gas diffusion layer 30 is increased, the contact pressure between the diffusion part 10 which is continuously formed to the reaction part 20 and the gas diffusion layer 30 may also be increased.

In this case, when the non-compressed surface 15 is greater than a predetermined range (e.g., a range of about 0 mm to 3 mm), a permeated amount of the gas diffusion layer 30 into the diffusion channel 11 may be increased and when the gas diffusion layer 30 is permeated into the diffusion channel 11, a differential pressure may be increased or water discharge performance may be reduced, and thus a function of the diffusion part 10 may be reduced. As a result, the non-compressed surface 15 may be prevented from being increased greater than the predetermined value.

However, when the diffusion channel 11 is formed to be less than a predetermined range to prevent the non-compressed surface 15 from being increased, the diffusion part 10 may be hardly manufactured and thus the manufacturing performance may be degraded.

Accordingly, the reaction channel 21 having a height greater than that of the diffusion channel 11 without changing a size of the diffusion channel 11 may be provided to provide a suitable compression rate at which the diffusion part 10 and the gas diffusion layer 30 adhere to each other less than a compression rate at which the reaction part 20 and the gas diffusion layer 30 adhere to each other. As consequence, the contact pressure may be reduced substantially or barely generated in the diffusion channel 11 while the contact pressure is sufficiently increased in the reaction channel 21.

As ΔH refers to the height difference between the reaction part 20 and the diffusion part 10, the following Formula 4 which obtains a height difference between the reaction part 20 and the diffusion part 10 may be provided.

$$\Delta H = H_C - h_C = h_G - H_G \quad [4]$$

Further, as $C_P$ refers to the compression rate of the gas diffusion layer 30 at the diffusion part 10 side, the following Equation 5 may be satisfied.

$$3\% \leq C_P \leq 13\% \quad [5]$$

In addition, when the gas diffusion layer 30 is compressed by staking the cells of the fuel cell or assembling the fuel cell stack, a summed value of the height of the gas diffusion layer 30 at the diffusion part side and the height of the diffusion part 10 and a summed value of the height of the gas diffusion layer 30 at the reaction part side and the height of the reaction part 20 may be equal to each other and thus an outer side of the gas diffusion layer 30 may be flat without being inclined or bent.

As shown in FIG. 1, in the fuel cell stack according to an exemplary embodiment of the present invention, the diffusion channel 11 and the reaction channel 21 may be continuously formed.

Meanwhile, the diffusion channel 11 may be formed to have a height less than that of the reaction channel 21 but has a width greater than that of the reaction channel 21 such that the diffusion channel may maintain the water discharge performance which is a function of the diffusion part 10.

Figure 2:
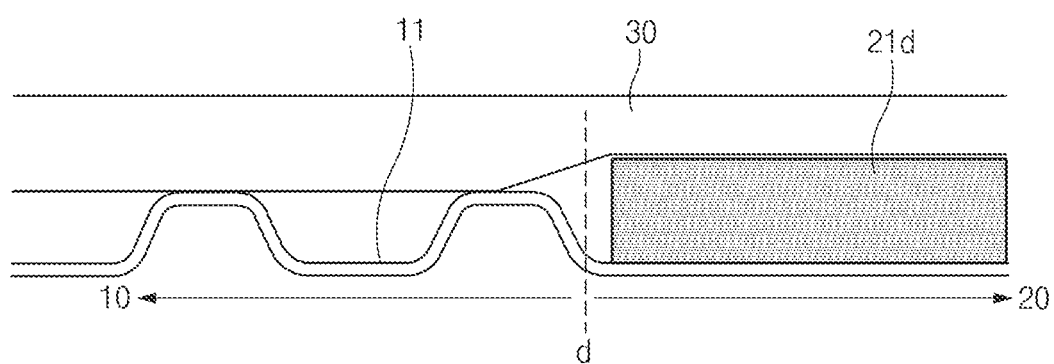
FIG. 2 illustrates a cross-sectional view of an exemplary separator including a diffusion part and a reaction part, and a gas diffusion layer in an exemplary fuel cell stack according to an exemplary embodiment of the present invention.

FIG. 2 shows a cross-sectional view schematically of an exemplary fuel cell stack according to another exemplary embodiment of the present invention.

As illustrated in FIG. 2, the reaction channel may not be formed in the reaction part 20 so that the diffusion channel 11 and the reaction channel may be formed discontinuously to each other and a micro porous body 21*d* may be inserted between the reaction part 20 and the gas diffusion layer 30.

In particular, the micro porous body 21*d* may be formed to have a height greater than that of the diffusion channel 11.

Further, an inside of the micro porous body 21*d* may be finely provided with a plurality of channels and thus a function of the reaction channel may be performed by the micro porous body 21*d*. Accordingly, the reaction part 20 may not be provided with a separate channel other than the micro porous body 21*d*.

As described in FIGS. 1 and 2, a boundary between the diffusion part 10 and the reaction part 20 is represented by a virtual dotted line d and thus the diffusion part 10 and the reaction part 20 are represented by an arrow, being divided based on the virtual dotted line d.

As described above, according various exemplary embodiments of the present invention, the compressed amount of the gas diffusion layer at the diffusion part side may be minimized even though the contact pressure of the reaction part is increased in response to the reduction in the height of the diffusion channel, such that the manufacturing performance may be improved without increasing the differential pressure and reducing the water discharge performance.

Although the fuel cell stack according to exemplary embodiments of the present invention has been described with reference to the accompanying drawings, the present disclosure is not limited to the above-mentioned exemplary embodiment and drawings but may be variously modified and changed within the following claims by those skilled in the art to which the present invention pertains.

What is claimed is:

1. A fuel cell stack, comprising:
   a separator that comprises:
      a diffusion part, as being provided with a diffusion channel, the diffusion part configured to distribute reaction gas and cooling water, and
      a reaction part, as being continuously formed from the diffusion part and inserted with a porous body having a plurality of channels provided therein, the reaction part configured to move reaction gas distributed from the diffusion part and generate electrons by a chemical reaction; and
   a gas diffusion layer configured to contact the diffusion part of the separator and the reaction part of the separator,
   wherein the porous body is inserted between only the reaction part of the separator and the gas diffusion layer, and
   wherein a height of the porous body is greater than a height of the diffusion part of the separator.

2. The fuel cell stack according to claim 1, wherein a compression rate where the diffusion part and the gas diffusion layer are contacted to each other is less than a compression rate where the reaction part and the gas diffusion layer are contacted to each other.

3. The fuel cell stack according to claim 1, wherein when the gas diffusion layer is compressed, a summed value of a height of the gas diffusion layer contacting the diffusion part and a height of the diffusion part and a summed value of the height of the gas diffusion layer contacting the reaction part and a height of the reaction part are equal to each other.

4. The fuel cell stack according to claim 1, wherein the diffusion channel has a height less than that of the porous body, and the diffusion channel has a width greater than that of the porous body.

* * * * *